United States Patent [19]

Bronicki

[11] Patent Number: 4,996,846
[45] Date of Patent: Mar. 5, 1991

[54] METHOD OF AND APPARATUS FOR RETROFITTING GEOTHERMAL POWER PLANTS

[75] Inventor: Lucien Y. Bronicki, Yavne, Israel

[73] Assignee: Ormat Inc., Sparks, Nev.

[21] Appl. No.: 478,264

[22] Filed: Feb. 12, 1990

[51] Int. Cl.$^5$ ................................................ F03G 7/00
[52] U.S. Cl. ...................................... 60/641.2; 60/677
[58] Field of Search ................. 60/641.2, 641.3, 641.5, 60/677

[56] References Cited

U.S. PATENT DOCUMENTS 4,542,625 9/1985 Bronicki ............................. 60/641.2

FOREIGN PATENT DOCUMENTS 48301 1/1983 Japan .................................. 60/641.5

Primary Examiner—Allen M. Ostrager
Attorney, Agent, or Firm—Sandler, Greenblum & Bernstein

[57] ABSTRACT

An existing geothermal power plant, utilizing geothermal steam from a production well in a geothermal field to drive a multi-stage steam turbine when the available steam pressure from the production well for rated mass for steam through the turbine is less than the design pressure of the turbine, is retrofitted by increasing the mass flow of steam from the production well by an incremental amount. Substantially all of the incremental amount of steam is diverted to an organic fluid Rankine cycle power plant for converting heat in the diverted steam to power and producing waste fluid in the form of steam condensate and non-condensable gases. The waste fluid is injected into a reinjection well in the geothermal field. Preferably, the non-diverted portion of steam is applied to the steam turbine and an intermediate stage of the turbine where the design pressure of the stage matches the steam pressure of the applied steam.

34 Claims, 3 Drawing Sheets

METHOD OF AND APPARATUS FOR RETROFITTING GEOTHERMAL POWER PLANTS

DESCRIPTION

1. Technical Field

This invention relates to power plants that operate on geothermal steam, more particularly to a method of an apparatus for retrofitting existing geothermal power plants to take into account declining reservoir pressure in the geothermal field producing the steam.

2. Background of the Invention

One of the more famous geothermal fields in the United States is The Geysers in California. A power plant typical of plants at The Geysers for using geothermal steam is illustrated in FIG. 1. Such power plant includes a multi-stage steam turbine designed for given inlet steam conditions of temperature and pressure as well as mass flow for driving a synchronous generator that supplies power to a power grid. Steam exhausted from the last stage of the turbine is supplied, typically, to a water cooled surface or spray condenser where water from a cooling tower is used to cool and condense the steam. Most of the condensed steam is used as make-up water.

Geothermal steam often contains non-condensable gases, mainly hydrogen sulfide, whose venting to the atmosphere is environmentally unacceptable. Consequently, the contents of the condenser may be chemically treated for reducing the amount of free hydrogen sulfide gas that escapes to the atmosphere in the cooling tower.

When large scale power production was initiated at The Geysers reservoir in 1960, the datum pressure of steam at most well heads in the reservoir was about 500 psi. While recently drilled production wells on the west side of the reservoir report pressures at 600 psi, the well-head pressure of most producing wells in The Geysers reservoir has dropped to around 200 psi, and well-head pressure is declining at a rate of 15-20% per year. As a consequence, sufficient steam is now available to utilize only 1,500 MW of the 1900 MW installed capacity. As a consequence, about 400 MW of installed generating capacity is idle.

The continuing reduction in reservoir pressure is ominous because the reservoir pressure is approaching the minimum inlet pressure of many of the installed steam turbines. When this level of pressure is reached, additional generating capacity will be idled.

Coupled with the problem of a continuing decrease in reservoir pressure is the accompanying increase in the fraction of non-condensable gases in steam produced in certain regions of the reservoir. Many of the existing turbines are not designed to operated with the level of non-condensable gases encountered in these regions of The Geysers reservoir, and at least one power plant has recently been shut down for this reason. The increased amount of non-condensable gases in the geothermal steam in affected regions is being countered by some operators by importing steam from different regions of the reservoir and mixing the imported steam with local steam to lower the non-condensable gas content.

A further problem exists in the northwest region of The Geysers reservoir where the reservoir is deeper, drier, and hotter. Steam from this region contains hydrogen chloride gas which, in the presence of water, produces corrosive hydrochloric acid. As a consequence of corrosion problems, two 66 MW turbines were recently taken out of operation.

Because of the economic consequences resulting from having 20% of the installed generating capacity of The Geysers reservoir currently sitting idle, much effort has been devoted to countering the problem of reduced pressure in the reservoir. One approach being considered is to increase the amount of steam recovered from the cooling towers for reinjection into the reservoir. At present, only about 20% of the steam extracted from the reservoir is returned as condensate via reinjection wells.

Accordingly, it is an object of the present invention to provide a method of an apparatus for retrofitting geothermal power plants which is likely to provide a solution to the present problem of reduced reservoir pressure.

BRIEF DESCRIPTION OF THE INVENTION

The present invention is concerned with retrofitting an existing geothermal power plant of the type that utilizes geothermal steam from a production well in a geothermal field to drive a multi-stage steam turbine that is connected to a generator for generating electrical power. The generator produces less than its rated output because the available steam pressure from the production well, for rated mass flow of steam through the turbine, is less than the design pressure of the turbine. According to the present invention, the electrical output is increased by increasing the mass flow of steam from the well to the turbine by reducing the resistance to steam flow. Preferably, the high pressure stages of the turbine are by-passed and the steam is applied to an intermediate stage of a turbine where the design pressure matches the steam pressure. As a consequence, the turbine operates at increased efficiency with a greater mass flow than previously with the result that the power output of the generator is increased.

This approach is considered to be an interim solution that deals with increasing the output of the power plants associated with the reservoir, but does not address the underlying cause of the continuing reduction in well-head pressure. According to the present invention, the decline in well head pressure is countered by diverting a portion of the increased mass flow of steam from the production well to a first organic fluid Rankine cycle power plant for converting heat in the diverted steam to power, and producing waste fluid which usually will take the form of steam condensate and non-condensable gases. The waste fluid is then injected into a reinjection well in the geothermal field. In this manner, a substantial amount of steam drawn from the production well is used to generate power and is then returned to the reservoir.

The non-diverted portion of steam is applied to an intermediate stage of the steam turbine where the design pressure matches the steam pressure instead being applied to the inlet stage. In this case also, the efficiency of the existing steam turbine will be increased. This takes into account the lower pressure that is available at the wellhead and permits the steam turbine to operate at increased efficiency. In this manner, not only will the decline in well-head pressure be countered, but the level of power generation will be increased by the increase in the mass flow of steam from the production well.

The next stage in improving the performance of the geothermal power plant is to modify the condensing arrangement for the steam after it leaves the intermediate pressure stages of the steam turbine. According to the present invention, after the intermediate stages of the turbine, steam is diverted into a second organic fluid Rankine cycle power plant for converting heat in the turbine exhaust steam into power, and producing second waste fluid which usually takes the form of steam condensate and non-condensable gases. The second waste fluid is then injected into a reinjection well in the geothermal field. In this manner, all of the steam extracted from the reservoir is returned to the reservoir, together with the non-condensable gases. The last stages and the condenser of the steam turbine are not used.

According to the present invention, the existing power plant equipment, which includes the existing steam turbine and generator, are utilized more efficiently for generating power. The retrofit of the existing power plant includes a first Rankine cycle power plant effective to compensate for the power that the bypassed high pressure stages of the existing steam turbine previously delivered, and the second Rankine cycle power plant will generate approximately the power that the bypassed lower pressure stages of the steam turbine would have generated. In this manner, the power output from the installed generating equipment will approach the design rating of the existing equipment and should suppress further decreases in well-head pressure.

BRIEF DESCRIPTION OF THE DRAWINGS

Embodiments of the present invention are illustrated by way of example in the accompanying drawings wherein.

DETAILED DESCRIPTION

Figure 1:
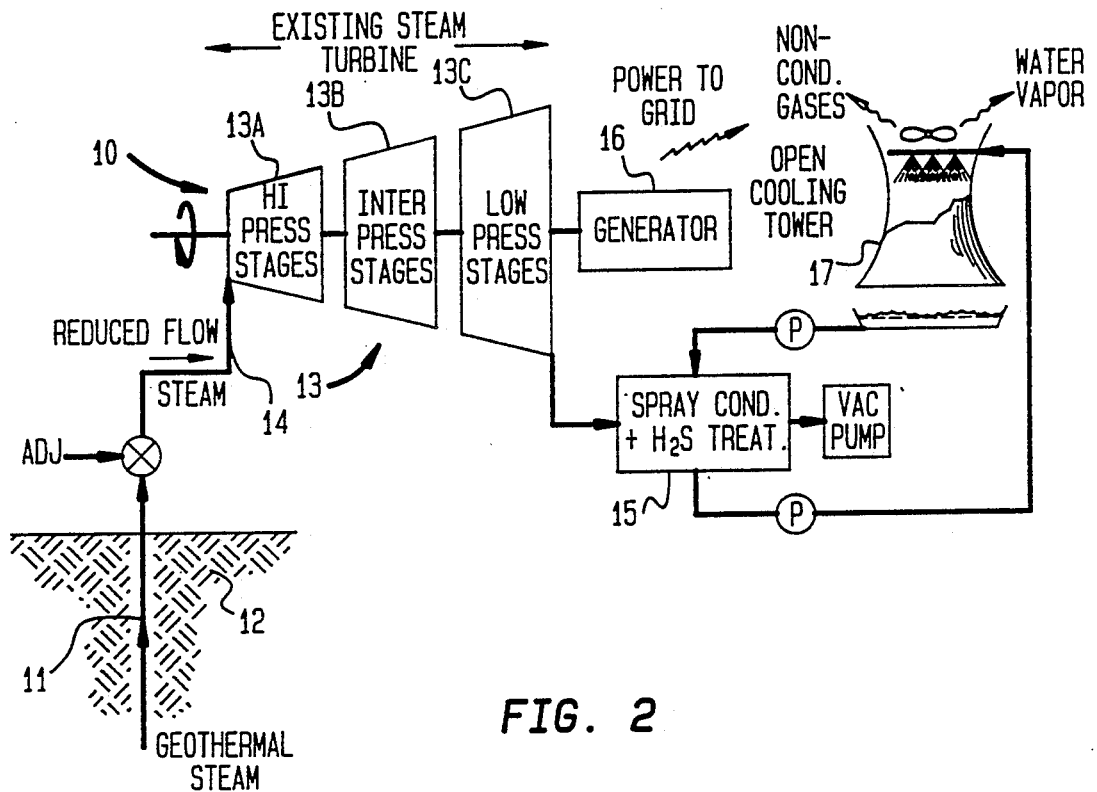
FIG. 1 is a schematic block diagram of a typical existing geothermal power plant that operates on geothermal steam.

Referring now to the drawings, reference numeral 10 designates a conventional power plant that is typical of those used to generate power in The Geysers reservoir. The power plant is supplied with geothermal steam produced by production well 11 in geothermal field 12. Wells in The Geysers field originally produced steam typically at about 400° F. which was available to the inlet stage of steam turbine 13 at a pressure in excess of about 500 psi. Such turbine was designed for these conditions of temperature and pressure and a given flow rate to produce power at a given level. For simplicity of illustration, the turbine is shown as having high pressure stages 13A, intermediate stages 13B, and low pressure stages 13C, but actually the turbine has many individual stages through which expansion of the geothermal steam occurs. Turbine 13 extracts heat from the steam as it expands in the turbine from the inlet pressure in inlet line 14 to the pressure of condenser 15, and drives generator 16 which generates electricity that is supplied to a power grid (not shown). Heat depleted steam exhausts from the last low pressure stage of the turbine into condenser 15 which, typically, is a direct contact spray condenser supplied with water derived from open cooling tower 17 to which hot condensate from the condenser is supplied. As a consequence of this arrangement, almost all of the steam extracted from the ground is returned as water vapor to the atmosphere.

Usually, the water vapor includes non-condensable gases contained in the geothermal steam. Such gases are mainly hydrogen sulfide; and condenser 15, as shown in FIG. 1, conventionally includes a chemical treatment module that neutralizes most, but not all, of the hydrogen sulfide gases in the geothermal steam.

As the geothermal field ages, the well-head pressure begins to decrease with the result that the power output of the turbine drops below its rated output. Moreover, the reduced inlet pressure causes the turbine to operate under conditions different from its design conditions; and the power output decreases further because the turbine efficiency decreases. In addition, the mass flow rate of steam through the turbine is related to the inlet steam pressure in a manner such that the reduction in pressure is accompanied by a reduction in mass flow rate, a factor that further decreases the power output. As a consequence, it is usually the case that the power plant operates at mass flow and inlet pressure values lower than nominal such that the power output will be at levels below the rated power of the turbine. Typically, the power plant will operate at 80% of its rated capacity; and as the geothermal field ages further, the expected operating level will decrease even further.

Figure 2:
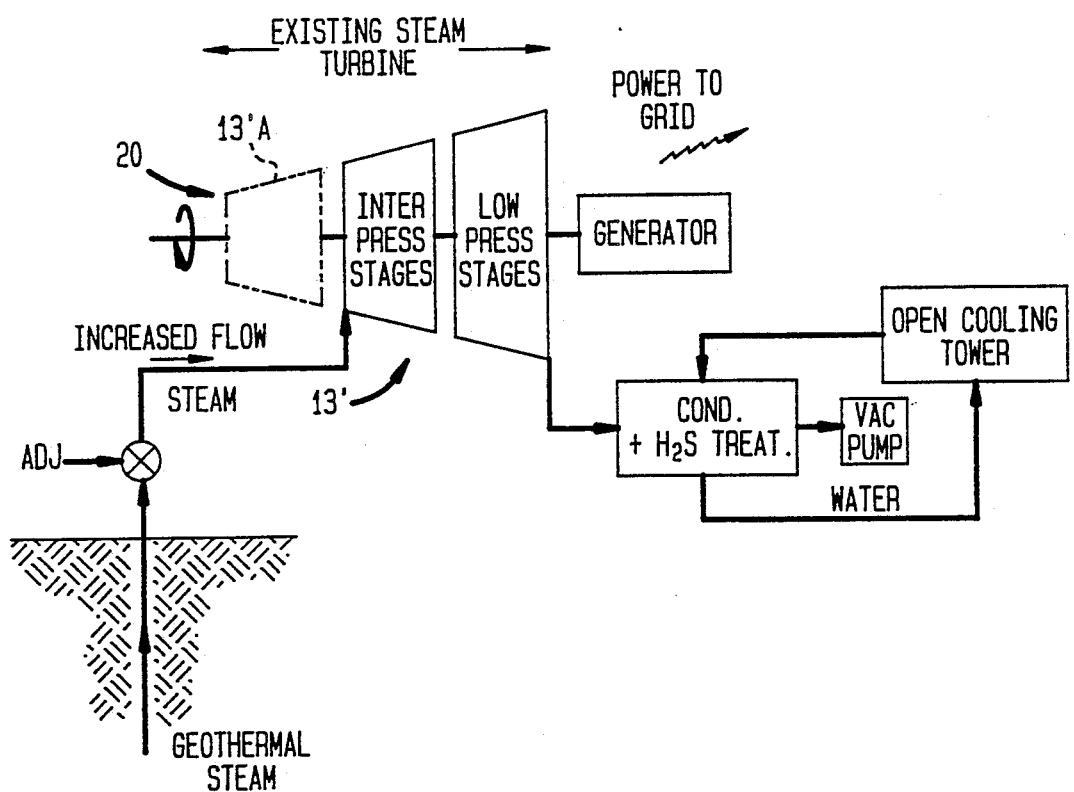
FIG. 2 is a block diagram showing a modification to an existing geothermal power plant for increasing the power output from the plant under conditions of reduced well-head pressure.

An initial approach to increasing the power of the plant shown in FIG. 1 is to increase the mass flow rate of steam from the well to the turbine by wherein the steam is preferably injected into the turbine at an intermediate stage instead of injecting the steam at the high pressure inlet to the turbine. Advantageously, the stage of the turbine at which injection occurs is the stage in the turbine designed for steam at the inlet pressure. This can be achieved, in a practical manner, by removing some of the high pressure blades ahead of stage whose design pressure matches the available pressure. This is illustrated schematically in FIG. 2 wherein some of the high pressure blades 13'A of turbine 13' have been removed.

Figure 3:
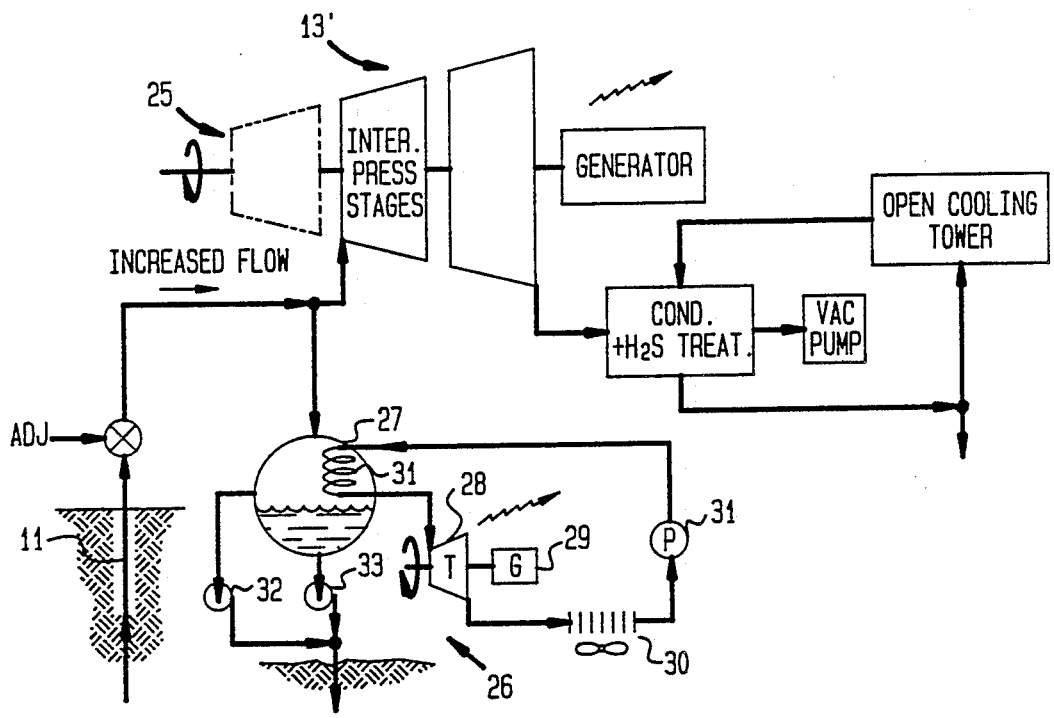
FIG. 3 is a block diagram showing incorporation into a conventional geothermal power plant of a first Rankine cycle power plant for countering decreased well-head pressure, and preferably increasing the power level of the power plant.

By increasing the mass flow to the design level, and by effecting expansion of the steam only in that portion of the turbine where steam will be at the conditions for which the turbine was designed, the power output of the turbine will be increased. However, the turbine output will nevertheless remain below its rated output because of the bypassing of some of the high-pressure stages. To further increase the mass flow at this reduced well-head pressure, an additional path has to be opened for the steam. An example of this is shown in FIG. 3 wherein a portion of an additional increase in mass flow of steam from the production well is diverted to organic Rankine cycle power plant 26 incorporated into the existing power plant. Heat contained in the diverted steam is thus used to produce power via plant 26 which also produces waste fluid comprising steam condensate and noncondensable gases. Such waste fluid is injected into reinjection well 27 in the field. To supply additional power, the embodiment of FIG. 3 may be used wherein the mass flow of steam from production well 11 can be increased by an incremental amount. The mass flow of steam through turbine 13' that is a part of power plant 25 may be substantially the same as the flow in turbine 13' in FIG. 2. Substantially all of the incremental increase in steam extracted from the production well is diverted to organic Rankine cycle power plant 26 which converts heat in the diverted steam to power. By suitable design, the power generated by plant 26 can be made to compensate for the reduction in power of turbine 13' caused by the reduction of well-head pressure.

As shown in FIG. 3, plant 26 produces waste fluid in the form of steam condensate and non-condensable gases. When little or no non-condensable gases are present, the waste fluid will take the form of steam condensate. The waste fluid is disposed of by being pumped into re-injection well 27 in the same field as production well 11.

Organic Rankine cycle power plant 26 is similar to the power plant disclosed in U.S. Pat. No. 4,542,625 issued Sept. 24, 1985, the subject matter which is hereby incorporated by reference. As disclosed in the '625 patent, the organic fluid Rankine cycle power plant includes vaporizer 27 for producing vaporized organic working fluid, and organic fluid turbine 28 coupled to electrical generator 29 and responsive to vaporized working fluid for converting heat in the vaporized working fluid to power. Heat depleted working fluid produced by the turbine is condensed in air-cooled condenser 30 is shown in FIG. 3. If cooling water is available, the condenser could be water cooled for more efficient operation of power plant 26. In either event, condenser 30 is responsive to the heat depleted working fluid for producing condensate which is returned to the vaporizer by operation of pump 31.

In operation, geothermal steam from well 11 is applied in parallel to both steam turbine 13' and to vaporizer 27 of power plant 26. Vaporizer 27 is constructed and arranged to produce waste fluid comprising condensed steam, shown schematically at the bottom of the vaporizer, and noncondensable gases as the heat in the steam is transferred through heat exchanger coils 31A to the organic working fluid. As disclosed in the '625 patent, gases in vaporizer 27 are pressurized in compressor 32 and combined with pressurized condensate produced by pump 33 for disposal in re-injection well 34.

Steam exhausted by turbine 13' may still be treated by a spray condenser as indicated in FIG. 3. With this arrangement, the mass flow of steam drawn from well 11 can be increased to a level equal to the original mass flow for which turbine 13' was designed so that the design mass flow rate is still available for the steam turbine which will consequently operate at its design efficiency. In this way, extra steam drawn from the production well is used in power plant 26 for generating power that compensates for the reduced power derived from steam turbine 13'. Furthermore, power plant 26 reduces the extra steam to waste fluid that is returned to the geothermal field to suppress further reduction in the well-head pressure.

The drawing shows the application of the geothermal steam to an intermediate stage of the turbine for illustration purposes. Actually, the steam is applied to the turbine at its high pressure inlet, but the blades of some of the high pressure stages are removed. Thus, the embodiments shown in FIGS. 2 and 3 require only minor modifications to the existing steam turbine. However, in the arrangement shown in FIGS. 2 and 3, the steam utilized by the turbine is utilized most efficiently. Consequently, the performance of the turbines in both FIGS. 2 and 3 will be improved over the performance of the steam turbine of FIG. 1 which must operate at reduced pressure and reduced mass flow by reason of the nature of the geothermal field supplying the steam. The arrangement according to the present invention will also result in increased efficiency because the intermediate and lower pressure stages of the turbine will operate at their design mass flow.

Figure 4:
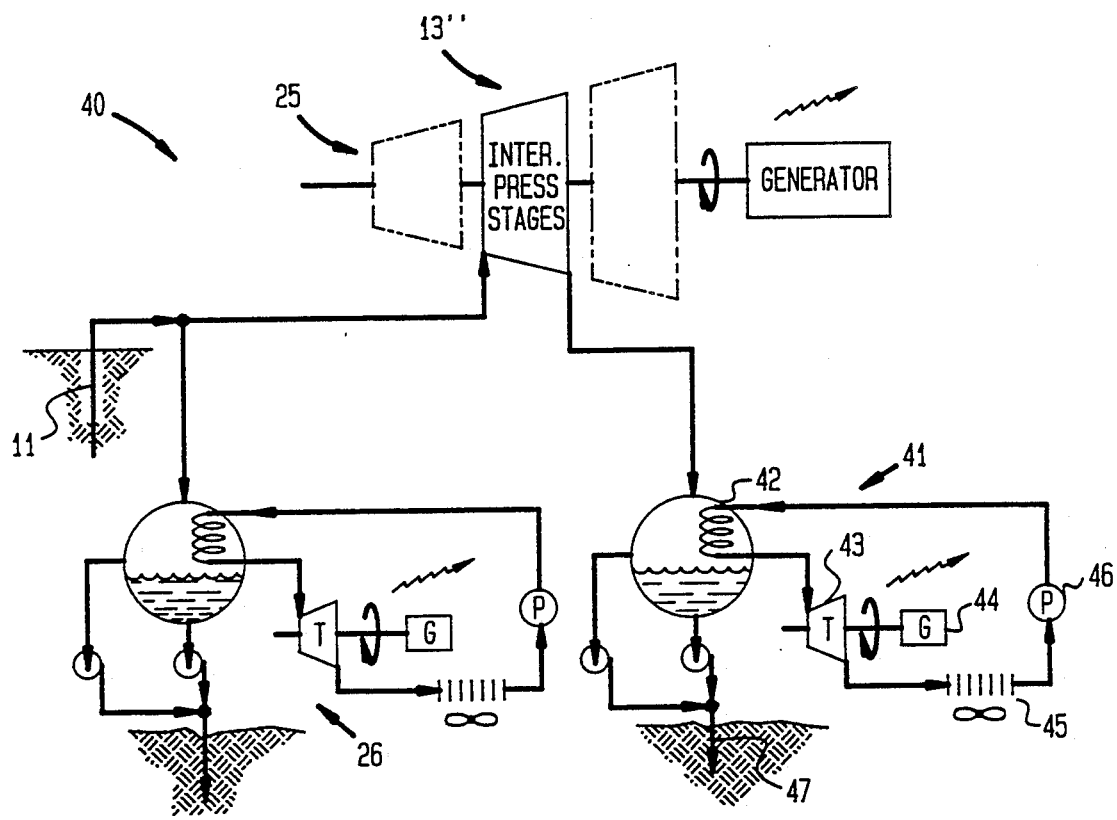
FIG. 4 is a block diagram similar to FIG. 3 but showing incorporation into the existing power plant of a second Rankine cycle power plant for also increasing the power output of the plant.

In the embodiment of FIG. 3, all of the steam extracted from the producing well in excess of the steam used in the steam turbine is returned to the reservoir containing the production well. A further retrofitting of the existing power plant to provide a still more efficient utilization of geothermal steam is illustrated in FIG. 4, wherein all of the geothermal steam used for power production is returned to the geothermal field in a manner similar to that described in U.S. Pat. No. 4,542,625. In FIG. 4, power plant 40 utilizes a second organic fluid Rankine cycle power plant 41 for replacing the low pressure stages and the conventional condenser of the steam turbine power plant. Power plant 41 thus comprises vaporizer 42 for producing vaporized working fluid, and organic fluid turbine 43 coupled to electrical generator 44 and responsive to vaporized working fluid for converting heat in the vaporized working fluid to power. Air-cooled condenser 45 is responsive to heat-depleted working fluid from turbine 43 for producing condensate which is returned to vaporizer 42 by the operation of pump 46.

Power plant 41 operates in a manner similar to power plant 26, and provides for the compression of noncondensable gases, if present in the vaporizer, for injection into re-injection well 47, together with pressurized condensate from the vaporizer. Waste fluid, constituted by pressurized condensate and the noncondensable gases, if present, are injected back into the field in which production well 11 is located.

In operation of this embodiment, steam from the production well is applied in parallel to the steam turbine and to first organic fluid Rankine cycle power plant 26 in the manner described in connection with FIG. 3. Preferably, as shown in FIG. 4, some of the high pressure blades in the steam turbine are removed so that the geothermal steam begins to interact with steam turbine 13" at an intermediate stage that matches the design pressure of the particular stage. The increased mass flow of geothermal steam permitted by this arrangement achieves the same results as described in connection with FIG. 3. However, in the embodiment shown in FIG. 4, some of the low pressure blades in the steam turbine may be removed so that the steam exhausts from the steam turbine, effectively, at an intermediate pressure level for application to power plant 41. The power produced by power plant 26 compensates for power lost by removing the high pressure blades from the steam turbine, and the power produced by power plant 41 replaces the power lost by removing the low pressure blading from the steam turbine. In this manner, all of the steam extracted from the reservoir is returned to the reservoir through re-injection wells while the retrofitted power plant produces power. The retrofitted power plant now has the capability of producing power at substantially rated value.

Figure 5:
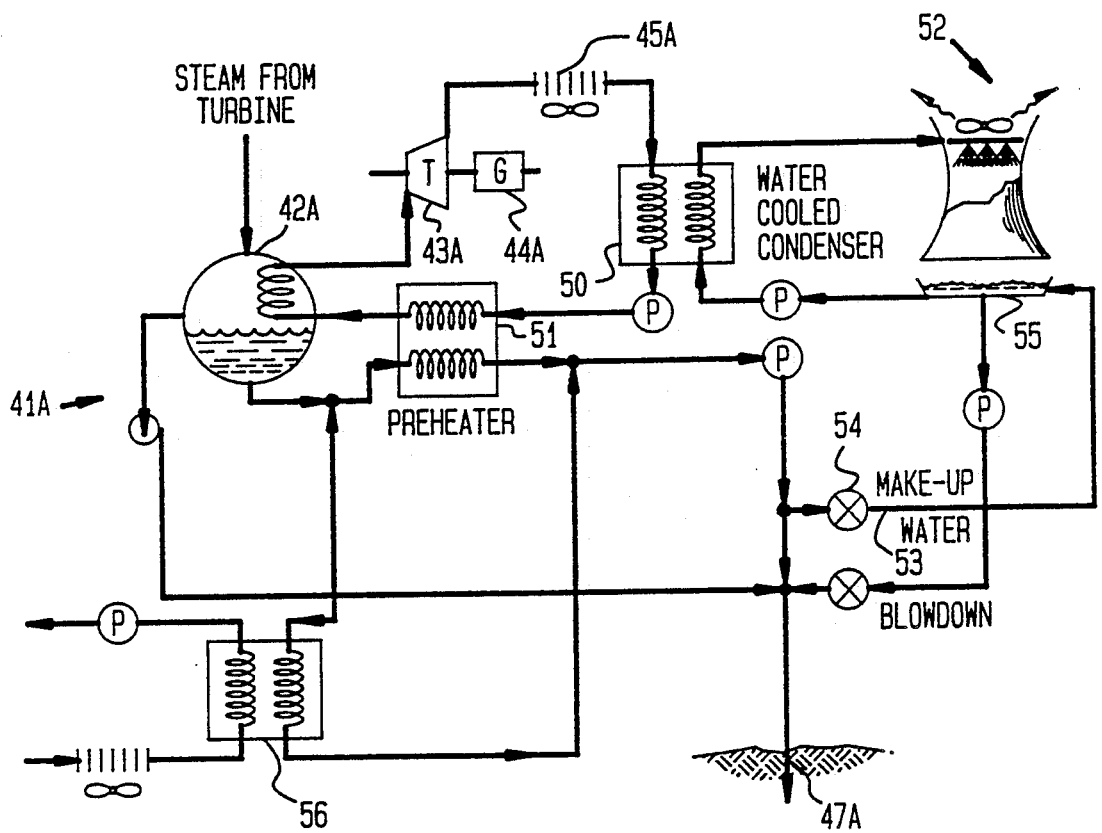
FIG. 5 is another embodiment of the apparatus shown in FIG. 4.
Figure 6:
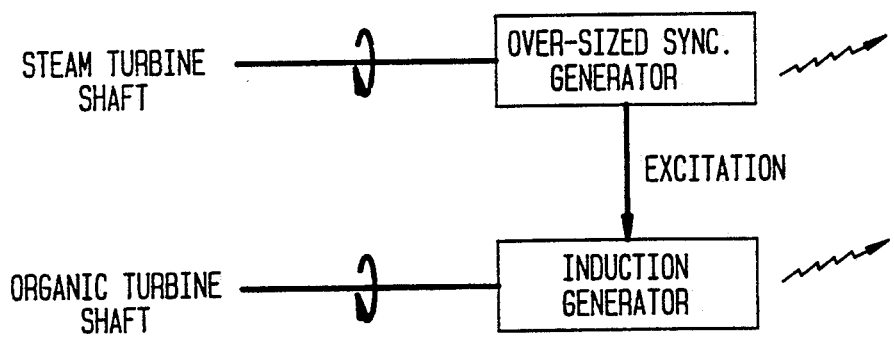
FIG. 6 is a block diagram illustrating the use of an existing synchronous generator of an existing steam turbine power plant to provide excitation for induction generators associated with organic Rankine cycle power plants which have been incorporated into the steam power plant.

Further efficiency in operation is achieved in the manner shown in FIG. 5 wherein power plant 41 of FIG. 4 is modified and is indicated by reference numeral 41A. Steam exhausted from the steam turbine is applied to vaporizer 42A which contains an organic working fluid which is vaporized as a consequence and supplied to turbine 43A which drives generator 44A. Heat-depleted organic working fluid exhausted from turbine 43A is condensed by air-cooled condenser 45A and then is returned to vaporizer 42A through heat exchangers 50, 51. Heat exchanger 50 is provided for the purpose of more deeply cooling the organic fluid and thus increasing the amount of work that turbine 43A will produce, particularly for summer peaking. Heat exchanger 50 is supplied with cooling water from cooling tower arrangement 52, make-up water for this cooling tower being derived from steam condensate produced by vaporizer 42A as indicated by conduit 53. Valve 54 controls the admission of make-up water to cooling pond 55, associated with cooling tower 52.

Heat exchanger 51 is provided for pre-heating the organic fluid before the fluid enters vaporizer 42A. To achieve this, steam condensate from vaporizer 42A is passed through heat exchanger 51 before being delivered to injection well 47A. The presence of heat exchanger 51 will increase the efficiency of power plant 41A.

Alternatively, or in addition, pre-heater 56 may be associated with the first organic fluid Rankine cycle power plant provided with geothermal steam, namely a power plant similar to power plant 26 shown in FIG. 4. Again, the use of pre-heaters will provide increased efficiency of the first organic fluid Rankine cycle power plant and thus increase the power output.

Conventionally, large-scale generators associated with steam turbines are synchronous generators. By reason of the effective removal of some of the blades in the steam turbine for the purpose of utilizing the remaining blades at their design condition, the generating capacity of the synchronous generators associated with the steam turbine will be oversized as compared to the power delivered by the steam turbine shaft. As a consequence, the power delivered by the synchronous generator will have an additional reactive power component. However, when the oversized synchronous generator is used in combination with induction generators associated with the smaller organic fluid Rankine cycle power plants described above, the reactive power available from the synchronous generator can be used for providing excitation to the induction generators which are less expensive than synchronous generators. Thus, the combination of oversized synchronous generators with induction generators for the organic fluid Rankine cycle power plants is an advantageous one because the type of power produced by each of these generators is complimentary.

While the above description of the present invention, particularly with reference to FIG. 4, refers to the use of a second organic fluid Rankine cycle power plant in conjunction with a first organic fluid Rankine cycle power plan, if preferred, the second organic fluid Rankine cycle power plant may be used in conjunction with a steam turbine as shown in FIG. 4, however, without using a first organic fluid Rankine cycle turbine.

The advantages and improved results furnished by the method and apparatus of the present invention are apparent form the foregoing description of the preferred embodiment of the invention. Various changes and modifications may be made without departing from the spirit and scope of the invention as described in the appended claims.

What is claimed:

1. A method for retrofitting an existing geothermal power plant of the type utilizing geothermal steam from a production well in a geothermal field to drive a multi-stage steam turbine connected to a generator for generating electrical power, wherein the available steam pressure from the production well, has decreased over time therefore reducing the power output, said power plant utilizing a water cooled surface or spray condenser for receiving turbine exhaust steam, and an open cooling tower by which most of the condensate produced by the condenser used as make-up water for the cooling tower and therefore is vented to the atmosphere along with non-condensable gases in the condenser, said method comprising the steps of:
   (a) increasing the mass flow of steam to the turbine thereby increasing the output of the turbine; and
   (b) applying the steam to an intermediate stage of the turbine where the design pressure matches the steam pressure whereby the increased efficiency of the turbine combined with the greater mass flow increases the power produced by the generator.

2. A method according to claim 1 further comprising the steps of:
   (a) increasing the mass flow of steam from the production well by an incremental amount;
   (b) diverting substantially all of said incremental amount of steam to a first organic fluid Rankine cycle power plant for converting heat in said diverted steam to power and producing waste fluid in the form of steam condensate and non-condensable gases; and
   (c) injecting said waste fluid into a reinjection well in said geothermal field.

3. A method according to claim 2 including the step of applying the non-diverted portion of steam to an intermediate stage of the steam turbine.

4. A method according to claim 2 including the step of applying the non-diverted portion of steam to an intermediate stage of the steam turbine where the design pressure of the stage matches the steam pressure of the applied steam.

5. A method according to claim 3 including the steps of diverting turbine exhaust steam from the intermediate stage and the condenser to a second organic fluid Rankine cycle power plant for converting heat in the turbine exhaust steam into power and producing second waste fluid in the form of steam condensate and non-condensable gases.

6. A method according to claim 5 including the step of injecting the second waste fluid into a rejection well in said geothermal field.

7. A method according to claim 6 including the step of using heat in the second waste fluid to preheat the organic fluid in the second organic Rankine cycle power plant.

8. A method according to claim 7 including the step of using heat in the second waste fluid to preheat the organic fluid in the first organic Rankine cycle power plant.

9. A method according to claim 6 including the step of using a water cooled condenser as a heat sink in the second Rankine cycle power plant.

10. A method according to claim 2 including the steps of using an induction generator in the first organic Rankine cycle power plant, and exciting the induction generator with the output of the generator driven by the steam turbine.

11. A power plant for use with geothermal steam from a production well in a geothermal field, said power plant comprising:
(a) a multi-stage steam turbine having a rated mass flow rate, and having a rated input steam pressure greater than the pressure of the geothermal steam, said steam turbine being connected to an electrical generator for generating electrical power;
(b) means for applying said geothermal steam at said rated flow rate to an intermediate pressure stage of said steam turbine where the design pressure of the stage is substantially the same as the pressure of said geothermal steam; and
(c) condenser means responsive to steam exhausted from the turbine for condensing the exhaust steam.

12. A power plant according to claim 11 wherein condensate from said condenser means is used as make-up water for a cooling tower so that the most of the exhaust steam is eventually vented to the atmosphere.

13. A power plant according to claim 11 further comprising:
(a) a first organic fluid Rankine cycle power plant having a vaporizer for producing vaporized organic working fluid, and an organic fluid turbine coupled to an electrical generator and responsive to vaporized working fluid for converting heat in the vaporized working fluid to power, and producing heat depleted working fluid, and an organic fluid condenser responsive to the heat depleted working fluid for producing condensate, and means for returning the condensate to the vaporizer, said vaporizer being constructed and arranged to produce first waste fluid comprising condensed steam during vaporization of the working fluid;
(b) means for applying geothermal steam in parallel to said steam turbine and to the vaporizer of said first organic fluid Rankine cycle power plant; and
(c) means for injecting the first waste fluid into a re-injection well in the field.

14. A power plant according to claim 13 wherein said means for applying geothermal steam in parallel is constructed and arranged so that rated mass flow of steam is extracted from the production well, and so that the steam supplied to the steam turbine is applied thereto at an intermediate stage where the design pressure of the stage is substantially the same as the pressure of the applied geothermal steam.

15. A power plant according to claim, 14 wherein steam exhausted from the turbine for application to said condenser means is exhausted at an intermediate stage of the turbine.

16. A power plant according to claim 15 wherein said condenser means includes a second organic fluid Rankine cycle power plant having a vaporizer for producing vaporized organic working fluid, an organic fluid turbine coupled to an electrical generator and responsive to vaporized working fluid for converting heat in the vaporized working fluid to power, and an organic fluid condenser responsive to heat depleted working fluid from the last mentioned turbine for producing condensate, and means for returning the condensate to the last mentioned vaporizer.

17. A power plant according to claim 16 wherein said vaporizer of the second organic fluid Rankine cycle power plant is constructed and arranged to produce a second waste fluid comprising condensed steam during the vaporization of the working fluid, and means are provided for injecting the second waste fluid into a re-injection well in the field.

18. A power plant according to claim 11 wherein steam exhausted from the turbine for application to said condenser means is exhausted at an intermediate stage of the turbine.

19. A power plant according to claim 18 wherein said condenser means includes an organic fluid Rankine cycle power plant having a vaporizer for producing vaporized organic working fluid, an organic fluid turbine coupled to an electrical generator and responsive to vaporized working fluid for converting heat in the vaporized working fluid to power, and an organic fluid condenser responsive to heat depleted working fluid from the last mentioned turbine for producing condensate, and means for returning the condensate to the last mentioned vaporizer.

20. A power plant according to claim 19 wherein said vaporizer of the organic rankine cycle power plant is constructed and arranged to produce waste fluid comprising condensed steam during the vaporization of the working fluid, and means are provided for injecting the waste fluid into a rejection well in the field.

21. A power plant according to claim 19 wherein said vaporizer of the organic fluid Rankine cycle power plant is constructed and arranged to produce waste fluid comprising condensed steam and non-condensable gases during the vaporization of the working fluid, and means are provided for injecting the waste fluid into a rejection well in the field.

22. A power plant comprising:
(a) a production well in a geothermal field for producing geothermal steam;
(b) a multi-stage steam turbine having a rated mass flow rate and a rated input steam pressure, and connected to an electrical generator for generating electrical power;
(c) a first organic fluid Rankine cycle power plant having a vaporizer for producing vaporized organic working fluid, and an organic fluid turbine coupled to an electrical generator and responsive to vaporized working fluid for converting heat in the vaporized working fluid to power, and producing heat depleted working fluid, and an organic fluid condenser responsive to the heat depleted working fluid for producing condensate, and means for returning the condensate to the vaporizer, said vaporizer being constructed and arranged to produce first waste fluid comprising condensed steam and non-condensable gases in the geothermal steam during vaporization of the working fluid;
(d) means for applying geothermal steam in parallel to said steam turbine and to the vaporizer of said first organic fluid Rankine cycle power plant;
(e) condenser means for condensing steam exhausted from the turbine; and
(f) means for injecting the first waste fluid into a rejection well in the field.

23. A power plant according to claim 22 wherein condensate from said condenser means used as make-up water for a cooling tower so that most of the exhaust steam is eventually vented to the atmosphere.

24. A power plant according to claim 22 wherein said organic fluid condenser is an air cooled condenser.

25. A power plant according to claim 22 wherein said means for applying geothermal steam in parallel is constructed and arranged so that rated mass flow of steam is extracted from the production well, and so that the steam supplied to the steam turbine is applied thereto at an intermediate stage where the design pressure of the stage is substantially the same as the pressure of the applied geothermal steam.

26. A power plant according to claim 25 wherein steam exhausted from the turbine for application to said condenser means is exhausted at an intermediate stage of the turbine.

27. A power plant according to claim 25 wherein said condenser means includes a second organic fluid Rankine cycle power plant having a vaporizer for producing vaporized organic working fluid, an organic fluid turbine coupled to an electrical generator and responsive to vaporized working fluid for converting heat in the vaporized working fluid to power, and an organic fluid condenser responsive to heat depleted working fluid from the last mentioned turbine for producing condensate, and means for returning the condensate to the last mentioned vaporizer.

28. A power plant according to claim 27 wherein said vaporizer of said second organic fluid Rankine cycle power plant is constructed and arranged to produce a second waste fluid comprising condensed steam and non-condensable gases during vaporization of the working fluid.

29. A power plant according to claim 28 including means for injecting the second waste fluid into a reinjection well in the field.

30. A power plant according to claim 29 including a preheater constructed and arranged to preheat organic fluid in said second Rankine cycle power plant with heat contained in said second waste fluid.

31. A power plant according to claim 30 including an auxiliary preheater constructed and arranged to preheat organic fluid in said first Rankine cycle power plant with heat contained in said second waste fluid.

32. A power plant according to claim 28 including means for injecting the second waste fluid into a reinjection well in the field.

33. A power plant according to claim 32 including a preheater constructed and arranged to preheat organic fluid in said second Rankine cycle power plant with heat contained in said second waste fluid.

34. A power plant according to claim 33 including an auxiliary preheater constructed and arranged to preheat organic fluid in said first Rankine cycle power plant with heat contained in said waste fluid.

* * * * *